Figure 3:
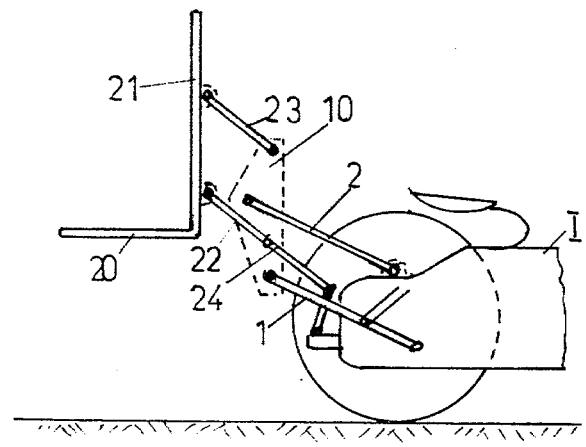

United States Patent [19]

Kalif

[11] 4,345,871
[45] Aug. 24, 1982

[54] HIGH-LIFT ATTACHMENT FOR AN AGRICULTURAL TRACTOR PROVIDED WITH A THREE-POINT LINKAGE

[76] Inventor: Eitan Kalif, 20b Yehoshua St., Afula, Israel

[21] Appl. No.: 136,469

[22] Filed: Apr. 2, 1980

[51] Int. Cl.³ ................................................ B66F 9/06
[52] U.S. Cl. .................................. 414/703; 414/707; 414/713; 414/917
[58] Field of Search ........ 414/703, 706, 707, 710–714, 414/917

[56] References Cited

U.S. PATENT DOCUMENTS

| 2,449,212 | 9/1948 | Fraga | 414/703 |
| 3,127,999 | 4/1964 | Gostomski | 414/703 |
| 3,468,442 | 9/1969 | Sarvela | 414/703 |

FOREIGN PATENT DOCUMENTS

| 663948 | 1/1952 | United Kingdom | 414/703 |
| 689935 | 10/1979 | U.S.S.R. | 414/703 |

Primary Examiner—John J. Love
Assistant Examiner—Terrance L. Siemens
Attorney, Agent, or Firm—John S. Roberts, Jr.

[57] ABSTRACT

A high-lift attachment for a tractor provided with a three-point linkage comprises a platform provided with a vertical backing frame, and a vertical intermediate frame positioned between the backing frame and the tractor body. The intermediate frame is connected to the three-point linkage arms of equal length by three pivots which are positioned on this frame in spatial alignment corresponding to the position of the points of attachment on the tractor, whereby the frame remains in its vertical position at any height of lift. The intermediate frame and the backing frame are interconnected by one upper and two lower links which are in parallel alignment and wherein the distance between their linkage points is identical for all three links. The two lower links are elongated beyond the intermediate frame towards the tractor body which latter is provided with a pivoted member serving to attach the ends of these links and to keep them in their initial lowermost position. When the intermediate frame is raised by the tractor arms, the two lower links lift the backing frame and the platform high above the intermediate frame, while at the same time reducing the distance of the load from the tractor and thereby the load moment.

5 Claims, 6 Drawing Figures

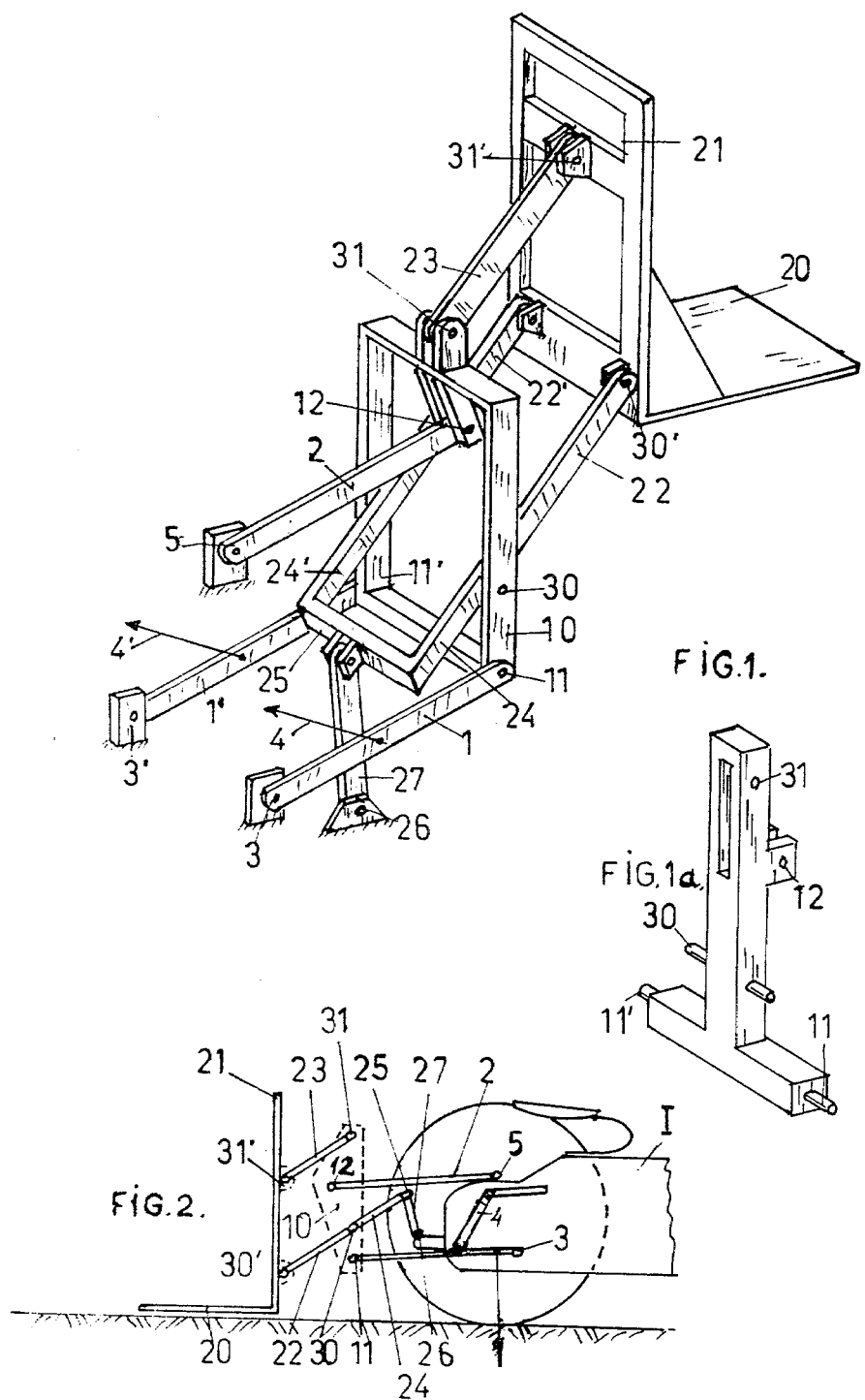

HIGH-LIFT ATTACHMENT FOR AN AGRICULTURAL TRACTOR PROVIDED WITH A THREE-POINT LINKAGE

The invention relates to a three-point linkage of an agricultural tractor, particularly to the attachment of a platform or fork to the linkage arms by mechanical transmission means that permit much higher lifting than would be possible by utilizing conventional linkage arms.

An agricultural tractor has to be designed for all possible kinds of work by attaching to it various implements; in addition to ploughing, cultivating, hoeing, fertilizing and other earth work, it is frequently used for loading equipment or products by attaching a fork or platform to the arms of its three-point-linkage. In many cases the lifting height to be reached by using the linkage arms is not sufficient for stacking of bales, loading of trucks and similar high-lift tasks; this cannot be remedied by the attachment of longer linkage arms, since the load would hereby be lifted at a point remote from the tractor's center of gravity, permitting a much smaller load to be lifted in order not to increase the tilting moment on the tractor and not to strain the hydraulic mechanism beyond its capacity.

It is, therefore, the object of the present invention to attach to a three-point-linkage a lifting implement designed for relative high lifting capacity, without essentially increasing the distance of the load from the tractor body. It is a further object to permit quick and simple attaching and exchanging of this implement while working in the field.

A high-lift attachment for an agricultural tractor, according to the invention, comprises a lifting implement, such as a platform or a fork provided with an upstanding backing frame means or a wall attached to the platform on the side facing the tractor. The lifting implement is connected to the three-point linkage of the tractor by means of an upstanding, intermediate frame which is in substantially parallel alignment with the upstanding frame means and pivotally connected thereto by two parallel lower links and by at least one upper link parallel to the lower links, the distance between the linkage points on each of the links being substantially identical for both the upper and the lower links respectively. The intermediate frame is, on the side remote from the lifting implement, pivotally connected to the tractor body by means of the arms of the three-point linkage, wherein all three arms are of the same length and wherein the pivots on the intermediate frame are positioned in spatial alignment corresponding to the points of attachment on the tractor body, thereby ensuring a motion of the intermediate frame at a uniform inclination relative to the ground. Either the upper or the lower links, or both, connecting the intermediate frame to the lifting implement are provided with an elongated portion extending beyond the intermediate frame in the direction of the tractor linkage, the ends of these portions being urged in downward direction so as to raise the lifting implement above the level of the intermediate frame.

In a preferred embodiment of the high-lift attachment the ends of the elongated portions of the connecting links are pivotally connected to the tractor body at a point below these ends, whereby the latter are retained at a substantially even level, while the linkage arms raise the intermediate frame as well as the lifting implement. This raises the lifting implement high above the intermediate frame.

In another embodiment a hydraulic or pneumatic linear actuator assembly is pivotally attached to the end of the elongated link portions and to the top of the intermediate frame respectively. This permits the raising of the lifting implement relative to the intermediate frame, independent of the action of the linkage arms.

The intermediate frame is preferably rectangular, but it may have the shape of an inverted "T" or any other shape suitable for attaching to it the links and arms connecting it to the tractor and the platform respectively.

Figure 4:
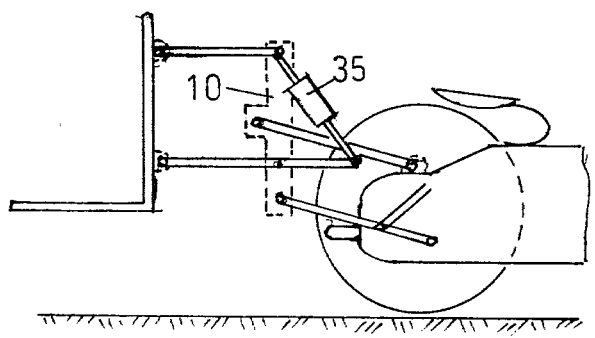
Figure 5:
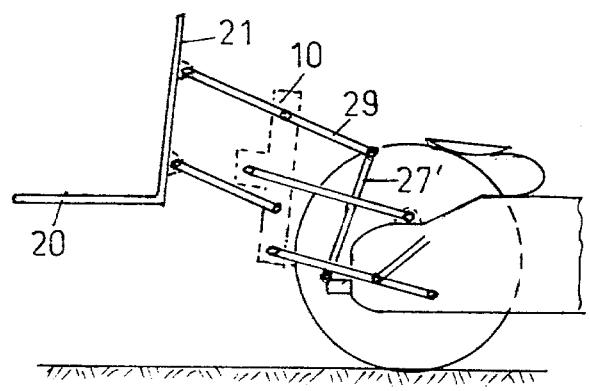

In the accompanying drawings which illustrate, by way of example, three different embodiments of the invention, FIG. 1 is a perspective elevation of a platform and a lifting mechanism attached to a three-point linkage, FIG. 1a illustrates an intermediate frame in the shape of an inverted "T", FIG. 2 is a diagrammatical side elevation of the mechanism of FIG. 1 in lowered state of the platform, FIG. 3 is a diagrammatic side elevation of the mechanism of FIG. 1, but in partly raised state of the platform, FIG. 4 is a diagrammatic side elevation of another embodiment of the invention, and FIG. 5 is a diagrammatic side elevation of a third embodiment of the invention.

Referring now to FIGS. 1 to 3 of the drawings, a tractor I is provided with a three-point linkage of known design consisting of two lower arms 1, 1' and one upper arm 2. The lower arms are pivotally attached to the tractor body in points 3, 3' and are adapted to be raised and swung about the pivots in a known manner, by hydraulically actuated links 4 and 4'. The upper arm is pivotally attached to the tractor body in a point 5 and is free to turn about the pivot in accordance with the movement of the implement attached to the linkage. It will be understood that the different components shown in FIG. 1 are diagrammatically shown and do not represent a working model of the mechanism. It is furthermore pointed out that the pivots 3, 3' and 5 represent parts of the tractor body which is not actually shown for the reason of not obscuring the picture.

With the purpose of keeping the intermediate frame 10 at a constant angle of inclination during the entire lifting operation the upper and lower arms are of the same length between pivots, which requires the replacement of the generally shorter upper arm of a conventional linkage by a new arm of the same length as the lower arms. The arms 1, 1' and 2 are pivotally attached in parallel alignment to pivots 11, 11' and 12 respectively of the intermediate frame 10 which is in substantially vertical position. Since the pivot 5 of the upper arm is generally positioned above and to the rear of the pivots 3 of the lower arms, it becomes evident that the pivot 12 at the end of the upper arm is in the same relative position to the pivots 11, 11' of the lower arms, whereby all three arms are kept in parallel alignment. In FIG. 1 the pivot 12 is attached to a double lug 13 projecting out of the frame 10, while the frames in FIGS. 2 and 3 are symbolically shown as a pentagonal figure (in broken Lines). The intermediate frame is linked to the upstanding wall or frame 21 of a platform 20 by two lower links 22, 22' and by one upper link 23, which are adapted to move in parallel alignment by being attached to corresponding, equally spaced pivots 30, 30' and 31, 31' on the frame and the platform wall, and by being of the same uniform length between these pivots. As a consequence the platform wall or frame which is perpendicular to the ground surface in initial, lowermost position, will be raised at exactly the same inclination, and the platform which is initially horizontal will remain so at every level reached.

The two lower arms are elongated to the front beyond their points of attachment to the intermediate frame by a portion 24, 24' each, which are interconnected at their ends by a cross member 25. This cross member is linked to a pivot 26 on the tractor body by an upright link 27 which keeps this cross member at about the same height above ground level.

For lifting the platform form its lowermost position as depicted in FIG. 2, the two lower arms 1 are raised by the hydraulic linkage 4, whereby the intermediate frame 10 is lifted and guided parallel to its initial inclination by the upper arm 2, The movement of the frame raises the links 22 and 23 and rotates them about their pivots 30, 31, since the front end of the lower links is retained in its low position, thereby lifting the platform 20, 21 to the required level, It can be visualized that the links 22, 23 rotate about their pivots 30, 31 by a much greater angle then the arms 1,2, permitting a high lift of the platform compared with the limited rotational movement of the arms of the three-point linkage (approximately 45°).

On the other hand the load on the platform is close to the center of gravity of the tractor, thus avoiding a tilting moment acting on the latter.

FIG. 4 shows a modification of the embodiment illustrated in FIGS. 1 to 3. Herein the link 27 between the cross member 25 and the tractor body is omitted and the downward movement of the elongations 24 is attained by a hydraulic linear actuator assembly 35 pivotally connecting the upper end of the frame 10 with the front end of the links 22, 24. By operating the linear actuator the distance between the two pivots 31 and 25 is increased, thus urging the cross member 25 in downward direction and lifting the platform fastened to the opposite ends of the links. While in the embodiment of FIGS. 1 to 3 the platform is lifted as a function of the lifting angle of the arms 1 of the three-point linkage, the present arrangement permits an independent relative movement between the platform and the frame. It is self evident that the actuator assembly and its hydraulic connections complicate the mechanism, however this embodiment may be advantageous for certain types of work in the field.

A third embodiment is illustrated in FIG. 5. Herein the two lower links 22 are not elongated to the front and these elongations linked to the tractor body as in FIGS. 1 to 3; instead, the upper link 23 projects to the front beyond its pivot 31 and the end of this elongated portion (29) is connected to the tractor body by a link 27'. Another divergent feature is the inclination of the platform wall by an angle to the perpendicular, requiring a similar inclination of the intermediate frame 10, while the platform 20 is horizontally positioned. These differences do not influence the operation of the mechanism, but may be of advantage for certain types of tractors and certain kinds of load to be lifted. The high-lift attachment as described in the foregoing undergo various modifications at the hand of a person skilled in the art, within the spirit of the present invention and the scope of the appended Claims. It is, for instance, proposed to provide two upper links instead of the one link illustrated and described; on the other hand, there may be two upper links and only one lower link.

A hydraulic actuator may be attached to various points of the intermediate frame and the links, with the object of raising the lifting implement. The aforedescribed linear actuator assembly is of the expanding type, but a contracting type actuator may serve equally well, one application proposed is to substitute a contracting actuator for the link 27 of FIGS. 1 to 3.

What we claim is:

1. A high-lift attachment for a tractor provided with a three-point linkage, comprising a lifting implement in the form of a platform or a fork provided with an upstanding backing frame or wall on the side facing the tractor; an upstanding intermediate frame positioned between said backing frame and said three-point linkage, in substantially parallel alignment with said backing frame and pivotally connected thereto by at least three upper and lower parallel links, wherein the distance between the pivot points on each of said links is equal, said intermediate frame being pivotally connected to the upper arm and to both lower arms of said three-point pivot, wherein said upper arm and said two lower arms are of identical length as measured between their respective pivot points, and wherein the pivot points of said upper arm are positioned rearwardly in respect of the pivot points of said lower arms, both on the tractor and on said intermediate frame; at least one of said links connecting said intermediate frame to said backing frame being provided with an elongated portion extending beyond said intermediate frame in the direction of said tractor linkage; means being provided for urging said elongated portion in a downwards direction.

2. A high-lift attachment as defined in claim 1, wherein said elongated portion of said link is pivotally connected to a pivot on the tractor body by means of a rigid link.

3. A high-lift attachment as defined in claim 1, wherein said elongated portion of said link is pivotally connected to a portion of said intermediate frame by a hydraulic linear actuator assembly.

4. A high-lift attachment as defined in claim 1, comprising a rectangular intermediate frame provided with pivot means for attaching to it the linkage arms and the connecting links to the platform frame.

5. A high-lift attachment as defined in claim 1, comprising an intermediate frame in the shape of an inverted "T" provided with pivot means for attaching to it the linkage arms and the connecting links to the platform frame.

* * * * *